Jan. 5, 1937.  J. BOWEN  2,066,554
FLUSH VALVE SILENCER
Filed July 1, 1935

Inventor
Joel Bowen
By Clarence A O'Brien
Attorney

UNITED STATES PATENT OFFICE 2,066,554

FLUSH VALVE SILENCER

Joel Bowen, Miami, Fla., assignor to Model Specialty Sales Company, Miami, Fla., a corporation of Florida Application July 1, 1935, Serial No. 29,342

8 Claims. (Cl. 137—93)

This invention relates to an accessory to be used in connection with valves, particularly with flush valves of the Sloan type, which is the subject matter of United States Patent No. 1,714,573, dated May 28, 1929.

It has been ascertained that wear of the parts of a valve causes the parts thereof to become loosely fitted, thereby causing the parts to vibrate when water flows through the same.

The vibration produces a loud and annoying noise, which usually extends throughout the water piping of a water system.

The principal object of my invention is attained by overcoming the foregoing disadvantages by providing a device which will at all times cause the parts of the valve to be snugly fitted, thereby eliminating the vibration and consequent noise.

Another object of my invention is to provide a silencer which may be manufactured at a reasonable cost, and which may be easily applied to the valve.

Other objects of the invention will be apparent from the following description of the present preferred form thereof, taken in connection with the accompanying drawing, wherein.

Figure 1:
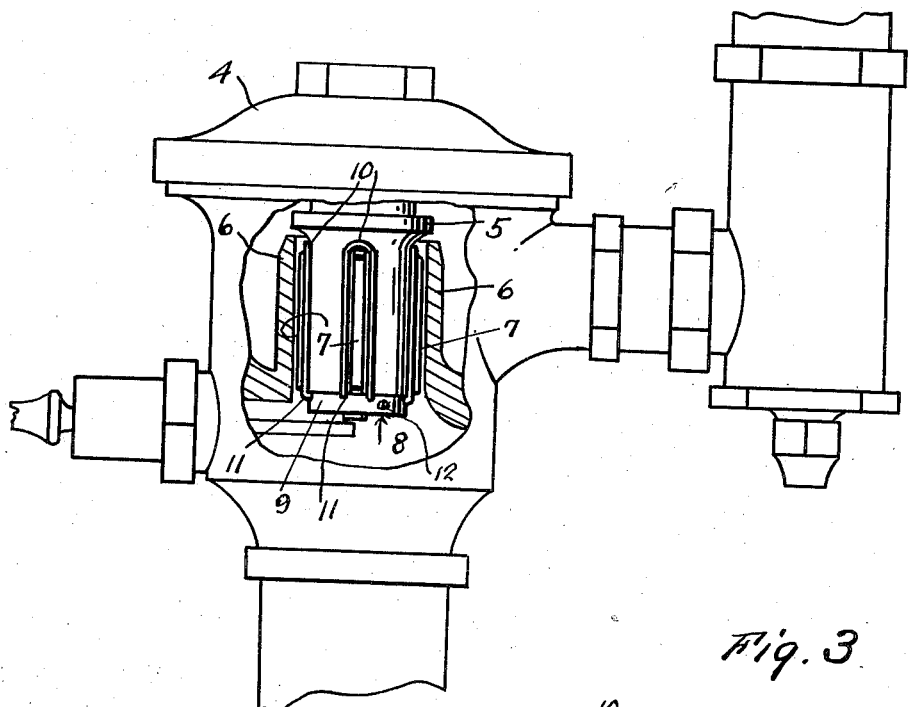
Fig. 1 is a view of my device as applied to a Sloan valve.

In the drawing, wherein for the purpose of illustration is shown a preferred embodiment of my invention, the numeral 4 designates the conventional Sloan valve, which is equipped with a cylinder 5, slidably mounted within the housing 6. This cylinder is provided at spaced intervals about its outer surface with guiding wings 7, which are adapted to contact the inner wall of the housing 6, and to guide the cylinder in its movement within the housing.

It is obvious that the sliding contact between the guiding wings 7 and the inner wall of the housing 6 causes an appreciable wear on the respective surfaces, thereby producing an intervening space between them. When water flows through the valve, the loosely fitting cylinder 5 vibrates against the inner wall of the housing 6, thereby causing considerable noise.

To compensate for this intervening space, I provide a flush valve silencer 8, which consists of a metal band 9 and spring fingers 10 attached to the upper edge of the band and extending therefrom. These fingers are preferably U-shaped in configuration, and are offset from the band 9 as at 11, the purpose of which will be hereinafter explained. Due to their resiliency, they are adapted to be bent to any desired position in relation to the band 9.

Figure 2:
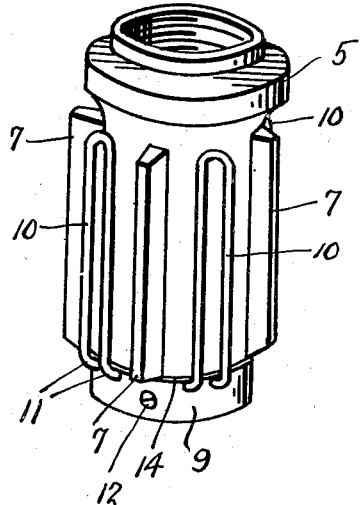
Figure 2 is a perspective view of my device as applied in a modified manner.
Figure 3:
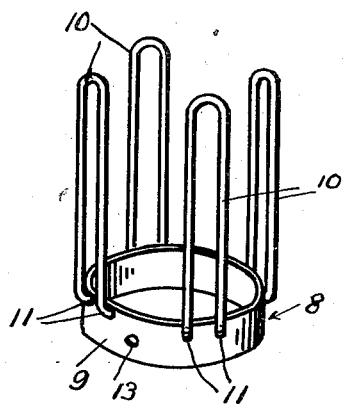
Figure 3 is a perspective view of my device.

The silencer 8 is applied to the cylinder 5 by attaching the band 9 to the lower portion of the cylinder by means of the screw 12, which passes through the opening 13 in the band. The offset 11 of the fingers accommodate the offset 14 of the cylinder. When so positioned, the fingers 10 may either bear directly against the surface of the cylinder between the guiding wings 7 as shown in Figure 2, or may straddle the guiding wings 7 as shown in Figure 1. The latter application offers less resistance to the water flow.

After the silencer has been applied, the spring fingers 10 may be bent outwardly toward the wall of the casing to bear against the same, thereby compensating for any intervening space between the guiding wings 7 and the wall of the casing 6.

It is to be understood that the form of my invention herein shown and described is to be taken as a preferred embodiment of the same, and that various changes in the shape, size and arrangement of parts may be made, without departing from the spirit of my invention, or the scope of the appended claims.

Having thus described my invention, what is claimed as new is:

1. In combination, a valve comprising a housing, a casing within the housing, a cylinder slidably mounted within said casing, and a silencer comprising a band and spring fingers attached to the band and extending therefrom, said silencer being adapted to be attached to the cylinder to compensate for intervening spaces between the cylinder and the casing.

2. A silencer for valves comprising a continuous metal band, and spring fingers attached to said band and adapted to be adjusted to compensate for intervening spaces between parts of a valve.

3. In combination, a valve comprising a housing, a casing within the housing, a cylinder slidably mounted within said casing, spaced guiding wings mounted on said cylinder, and a silencer attached to the cylinder and comprising a band and spring fingers attached to the band and extending therefrom, said fingers normally bearing against the outer surface of the cylinder between the spaced guiding wings, and adapted to be bent toward the casing to compensate for intervening spaces between the casing and the guiding wings of the cylinder.

4. In combination, a valve comprising a housing, a casing within the housing, a cylinder slidably mounted within said casing, spaced guiding wings mounted on said cylinder, and a silencer attached to the cylinder and comprising a band and spring fingers attached to the band and extending therefrom, said finger being adapted to normally straddle the guiding wings, and further adapted to be bent toward the casing to compensate for the intervening spaces between the casing and the guiding wings of the cylinder.

5. A silencer for valves comprising a continuous metal band, and adjustable means attached to said band to compensate for intervening spaces between parts of a valve.

6. A silencer for valves comprising a continuous metal band, and spring fingers each having one end attached to said band and the other end free, whereby said fingers are adapted to be adjusted to compensate for intervening spaces between parts of a valve.

7. A silencer for valves comprising a metal band, and U-shaped resilient fingers having their ends secured to said band and having the U-shaped portions free to be bent to compensate for intervening spaces between parts of a valve.

8. For use with a valve comprising a housing, a casing and a cylinder slidably mounted within said casing and having an offset portion, a silencer attached to the cylinder, said silencer comprising a band and spring fingers attached to said band and offset therefrom to accommodate the offset portion of the cylinder and adapted to be bent toward the casing to compensate for intervening spaces between the casing and the cylinder.

JOEL BOWEN.